May 13, 1969     O. FAUTH     3,443,818
QUICK-CHANGE CHUCK
Filed July 11, 1967
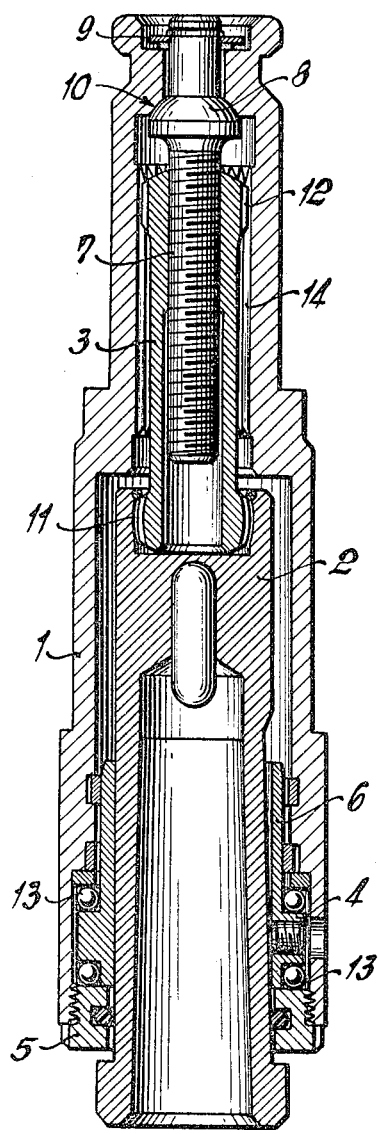
INVENTOR
OTTO FAUTH
BY Dicke & Craig
ATTORNEYS

United States Patent Office 3,443,818
Patented May 13, 1969

3,443,818
QUICK-CHANGE CHUCK
Otto Fauth, Nellingen, near Esslingen, Germany, assignor to Otto Bilz, Nellingen, Germany
Filed July 11, 1967, Ser. No. 652,600
Claims priority, application Germany, July 20, 1966, B 88,080
Int. Cl. B23b *31/00, 5/22, 5/34*
U.S. Cl. 279—16                7 Claims

ABSTRACT OF THE DISCLOSURE

A quick-change chuck in which the floating tool holder is adjustable in its axial direction relative to its cylindrical housing by means of an adjusting screw.

---

The present invention relates to improvements in a quick-change chuck which is provided with a floating tool-holding insert which is guided by a bushing.

It is an object of the invention to provide a quick-change chuck in which the floating tool holder which is mounted at the inside of the tubular shank or housing of the chuck by a self-aligning bearing is adjustable in its axial direction relative to the housing and to this bearing and the guide bushing thereof. This is attained according to the invention by providing an intermediate cylindrical member which is inserted centrally into the housing and connects the latter to the inner end of the tool holder so as to drive the same and is adjustable longitudinally relative to the housing and the self-aligning bearing by a long adjusting screw for shifting the tool holder to different positions in its axial direction.

For attaining this object, the invention provides the front end of this intermediate cylindrical driving member with gear teeth which mesh with corresponding internal teeth in the rear end of the tool holder, while the rear end of this driving member is likewise provided with gear teeth which mesh with and are slidable along internal teeth in the chuck housing which are made of a considerably greater length than those on the rear end of the driving member so as to permit the latter together with the tool holder to be adjusted longitudinally to different positions while remaining in rotary engagement with the housing. For attaining a pivotal connection between the front end of the cylindrical driving member and the rear end of the tool holder, these two ends are provided with arcuately-shaped teeth, while the slidable teeth on the rear end of the driving member and the long teeth in the housing may be provided in the form of external and internal splines.

The adjusting screw extends centrally through the rear end of the housing and is rotatable at its rear end from the outside. In order to permit the adjusting screw also to pivot to a certain extent relative to the housing, it is preferably provided near its rear end with a spherical flange which engages at all times resiliently upon a corresponding spherical shoulder on the inner wall of the housing. This resilient connection is produced by a suitable spring which connects the adjusting screw with the housing and is preferably mounted within a recess in the rear end of the housing.

When the adjusting screw is turned, the driving member together with the tool holder will therefore be shifted in the axial direction of the housing, while the teeth on the rear end of the driving member remain in engagement with the long teeth in the housing. Since the tool holder is likewise slidable in the axial direction within the bushing of the self-aligning bearing which is mounted on the front end of the housing, this bearing does not interfere with the axial adjustability of the tool holder but insures at all times a steady and true rotation of the tool holder.

The quick-change chuck according to the invention therefore permits the floating tool-holding insert to be easily adjustable in its axial direction by very simple means without requiring the outer dimensions of the chuck to be increased. It is especially of advantage that the invention permits the tool-holding insert to be made very short and the outer diameter of the entire chuck to be made very small. This is important especially when the quick-change chucks according to the invention are employed in machine tools, assembly lines, or the like which are provided with a larger number of drive spindles and wherein each individual quick-change chuck should be separately adjustable as quickly as possible and the adjacent chucks should be spaced at very small distance from each other.

These and other features of the invention will become more clearly apparent from the following detailed description thereof which is to be read with reference to the accompanying drawing which shows diagrammatically a longitudinal section of a preferred embodiment of the quick-change chuck according to the invention.

As illustrated in the drawing, this quick-change chuck comprises a cylindrical housing 1 in which the tool holder 2 is mounted by being guided within the front end of housing 1 by a self-aligning bearing 4. This bearing 4 comprises a bushing 6 and one or two rows of bearing balls 13 and it is secured in its axial position toward the outside by a threaded ring 5.

Housing 1 further contains axially behind the tool holder 2 a cylindrical connecting or driving member 3 which is provided near both ends with teeth 11 and 12. The teeth 11 on the front end of the driving member 3 are preferably made of an arcuate shape and engage with corresponding arcuate teeth in the rear end of tool holder 2 so as to permit the latter to carry out oscillating movements and not to interfere with these movements. The teeth 12 on the rear end of driving member 3 are preferably in the nature of external spline teeth and engage with corresponding internal spline teeth 14 which extend along the inner wall of the rear part of housing 1 and therefore are of a considerably greater length in the axial direction than the teeth 12 so that the driving member 3 will remain in any axial position thereof in meshing engagement with the housing 1.

The driving member 3 further contains an adjusting screw 7 which is screwed therein from the rear and extends to the rear end of housing 1. This adjusting screw 7 has a hemispherical flange 8 which engages at all times resiliently upon a shoulder 10 of a corresponding shape on the inner wall of housing 1. The rear end of the adjusting screw 7 carries for this purpose a spring 9 which is mounted in a recess in the end of housing 1 and may consist, for example, of a plate spring which is held in position by a washer and a spring ring. By making the flange 8 and the shoulder 10 of a spherical shape the advantage is attained that the adjusting screw 4 may likewise pivot universally relative to the housing 1.

When the adjusting screw 7 is turned at its rear end, the driving member 3 will be shifted in the axial direction so as to permit the tool holder 2 to be adjusted to its proper position. These adjusting movements of the tool holder 2 in its longitudinal direction may be carried out freely and without interference by the self-aligning bearing 4 and its bushing 6, and the tool holder 2 will be positively driven by the housing 1 regardless of the position to which it might be adjusted.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A quick-change chuck comprising a housing, a self-aligning bearing having a bushing mounted within said housing near the front end thereof, a tool holder slidable in the axial direction within said bushing and guided thereby, an intermediate cylindrical driving member centrally within said housing and pivotably but nonrotatably connecting the rear end of said tool holder to said housing, and means for adjusting said driving member together with said tool holder in the axial direction relative to said housing.

2. A quick-change chuck as defined in claim 1, further comprising first external teeth on the front end and second external teeth on the rear end of said driving member, first internal teeth in the rear end of said tool holder in mesh with said first external teeth, and second internal teeth on the inner wall of said housing in mesh with said second external teeth.

3. A quick-change chuck as defined in claim 2, wherein said second internal teeth in said housing are of a considerably greater length than said second external teeth on the rear end of said driving member so as to permit the latter to slide in the axial direction of said housing along said second internal teeth while remaining in mesh therewith.

4. A quick-change chuck as defined in claim 3, wherein said first external teeth on said driving member and said first internal teeth in said tool holder have an arcuate shape, while said second external teeth on said driving member and said second internal teeth in said housing form external and internal splines, respectively.

5. A quick-change chuck as defined in claim 1, wherein said adjusting means comprise an adjusting screw rotatably mounted in a fixed axial position in said housing and screwed into said driving member and having a rear end adapted to be turned from the outside.

6. A quick-change chuck as defined in claim 5, wherein said adjusting screw has near its rear end a flange and the inner wall of said housing has a shoulder, said flange and said shoulder having associated spherical surfaces, and spring means for maintaining said surfaces in constant resilient engagement with each other.

7. A quick-change chuck as defined in claim 6, wherein said housing has a recess in its rear end, said spring means located within said recess and acting at one side upon the bottom thereof and at another side upon said adjusting screw.

References Cited

UNITED STATES PATENTS 2,533,758  12/1950  Better et al. _____ 279—16

ROBERT C. RIORDON, *Primary Examiner.*

U.S. Cl. X.R.

64—6